(12) United States Patent
Liao et al.

(10) Patent No.: US 12,322,753 B2
(45) Date of Patent: Jun. 3, 2025

(54) ELECTROLYTIC SOLUTION, AND PREPARATION METHOD THEREOF AND APPLICATION THEREOF

(71) Applicant: Zhuhai CosMX Battery Co., Ltd., Zhuhai (CN)

(72) Inventors: Bo Liao, Zhuhai (CN); Suli Li, Zhuhai (CN); Hai Wang, Zhuhai (CN); Yanming Xu, Zhuhai (CN); Junyi Li, Zhuhai (CN)

(73) Assignee: ZHUHAI COSMX BATTERY CO., LTD. (CN)

( * ) Notice: Subject to any disclaimer, the term of this patent is extended or adjusted under 35 U.S.C. 154(b) by 577 days.

(21) Appl. No.: 17/591,198

(22) Filed: Feb. 2, 2022

(65) Prior Publication Data

US 2022/0158243 A1   May 19, 2022

Related U.S. Application Data

(63) Continuation of application No. PCT/CN2021/079496, filed on Mar. 8, 2021.

(30) Foreign Application Priority Data

Mar. 9, 2020 (CN) .......................... 202010157537.4

(51) Int. Cl.
| | |
|---|---|
| H01M 10/0567 | (2010.01) |
| H01M 10/0525 | (2010.01) |
| H01M 10/0568 | (2010.01) |
| H01M 10/0569 | (2010.01) |

(52) U.S. Cl.
CPC ... *H01M 10/0567* (2013.01); *H01M 10/0525* (2013.01); *H01M 10/0568* (2013.01); *H01M 10/0569* (2013.01); *H01M 2300/0028* (2013.01)

(58) Field of Classification Search
CPC ......... H01M 10/0567; H01M 10/0525; H01M 10/0568; H01M 10/0569; H01M 2300/0028
See application file for complete search history.

(56) References Cited

U.S. PATENT DOCUMENTS

| | | | |
|---|---|---|---|
| 2014/0065476 A1 | 3/2014 | Kim et al. | |
| 2016/0013516 A1* | 1/2016 | Heishi | H01M 10/0569 |
| | | | 429/200 |
| 2020/0274200 A1* | 8/2020 | Koyama | H01M 10/0569 |

FOREIGN PATENT DOCUMENTS

| | | |
|---|---|---|
| CN | 102629696 A | 8/2012 |
| CN | 105074995 A | 11/2015 |
| CN | 105359324 A | 2/2016 |
| CN | 106785034 A | 5/2017 |
| CN | 107851846 A | 3/2018 |
| CN | 109546218 A | 3/2019 |
| CN | 109860706 A | 6/2019 |
| CN | 110176631 A | 8/2019 |
| CN | 110828893 A | 2/2020 |
| CN | 111244549 A | 6/2020 |
| EP | 2482374 A1 | 8/2012 |

OTHER PUBLICATIONS

Mancilla T, Contreras R, Wrackmeyer B, New Bicyclic Organylboronic Esters Derived from Iminodiacetic Acids, 1986, Journal of Organometallic Chemistry, vol. 307, pp. 1-6 (Year: 1986).*
First Office Action in CN Patent Application No. 202010157537.4 dated Jan. 27, 2021.
Communication issued in corresponding EP Patent Application No. 21768518.9, mailed on Jun. 23, 2023.
Search Report issued in corresponding EP Patent Application No. 21768518.9, mailed on Jun. 13, 2023.

* cited by examiner

*Primary Examiner* — Sean P Cullen
*Assistant Examiner* — Jonathan William Estes
(74) *Attorney, Agent, or Firm* — Dilworth IP, LLC

(57) ABSTRACT

An electrolytic solution includes an organic solvent, an electrolyte, and an additive. The additive includes a first compound represented by Formula 1, where $R_1$ is selected from one of a single bond, substituted or unsubstituted alkoxy, C1-C6 alkylene, and C2-C6 alkenyl; $R_2$ and $R_3$ each are independently selected from one of substituted or unsubstituted alkoxy, C1-C6 alkylene, and C2-C6 alkenyl; and $R_4$ is B or P. Since the first compound includes an N-containing group that may be combined with a protonic acid in the electrolytic solution, the electrolytic solution have good stability; moreover, the cycle performance of a lithium secondary battery is improved.

15 Claims, No Drawings

ELECTROLYTIC SOLUTION, AND PREPARATION METHOD THEREOF AND APPLICATION THEREOF

CROSS-REFERENCE TO RELATED APPLICATIONS

This application is a continuation of International Application No. PCT/CN2021/079496, filed on Mar. 8, 2021, which claims priority to Chinese Patent Application No. 202010157537.4, filed on Mar. 9, 2020. Both of the above applications are hereby incorporated by reference in their entireties.

TECHNICAL FIELD

The present disclosure relates to an electrolytic solution, and preparation method thereof and application thereof, belonging to lithium secondary battery technical field.

BACKGROUND

Since its commercialization, lithium secondary batteries, due to their outstanding features such as high energy density and good cycle performance, have been widely used in consumer digital products such as mobile phones, cameras and laptops, and the fields of cars, artificial intelligence, etc.

The current commercial lithium secondary battery electrolytic solution is mainly prepared by using a mixture of a cyclic organic compound and a linear organic compound as solvent, and lithium hexafluorophosphate (LiPF$_6$) as electrolyte. However, due to poor thermal stability, lithium hexafluorophosphate is easy to undergo decomposition reaction and generate PF$_5$, which in turn can easily react with trace impurities in the electrolytic solution to generate HF, and the generated HF will not only corrode the electrode material but also accelerate the decomposition of lithium hexafluorophosphate in the electrolytic solution, thus affecting the shuttling of lithium ions between positive and negative electrodes of the battery, making it difficult for the cycle performance of lithium secondary batteries to meet the existing demand.

Therefore, how to improve the cycle performance of lithium secondary batteries has attracted more and more attention.

SUMMARY

The present disclosure provides an electrolytic solution and its preparation method and application, which are mainly used to solve the problem of poor cycle performance of lithium secondary batteries caused by the electrolytic solution.

A first aspect of the present disclosure provides an electrolytic solution, including an organic solvent, an electrolyte, and an additive, with the additive including a first compound represented by Formula 1, where R$_1$ is selected from one of a single bond, substituted or unsubstituted alkoxy, C1-C6 alkylene, and C2-C6 alkenyl; R$_2$ and R$_3$ each are independently selected from one of substituted or unsubstituted alkoxy, C1-C6 alkylene, and C2-C6 alkenyl; and R$_4$ is B or P,

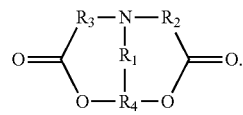

Formula 1

Further, the first compound is at least one of compounds represented by Formula 1-1, Formula 1-2, Formula 1-3 and Formula 1-4,

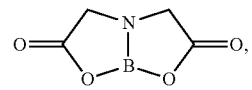

Formula 1-1

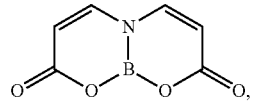

Formula 1-2

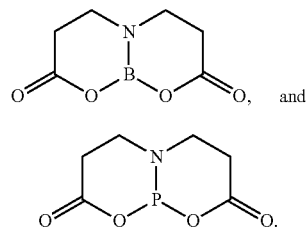

Formula 1-3

, and

Formula 1-4

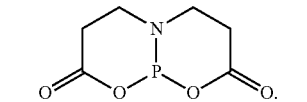

Further, the additive further includes a second compound, which is one or more of nitrile compound, sulfur-containing compound, phosphate ester compound, borate ester compound, lithium salt compound and carbonate ester compound.

Further, the nitrile compound is one or more of succinonitrile, glutaronitrile, adiponitrile, pimelonitrile, octanedinitrile, sebaconitrile, octadecane dinitrile, glycerol trinitrile, ethylene glycol bis(propionitrile) ether, fumaric acid dinitrile, ethoxypentafluorophosphonitrile, and 1,3,6-hexanetrinitrile; and/or the sulfur-containing compound is one or more of 1,3-propanesultone, 1,3-propylenesultone, and ethylene sulfate; and/or the phosphate ester compound is one or more of tris(trimethylsilyl)phosphate, triallyl phosphate, trimethyl phosphate, triethyl phosphate and tripropyl phosphate; and/or the borate ester compound is one or more of tris(trimethylsilyl) borate and trimethyl borate; and/or the lithium salt compound is one or more of lithium difluorophosphate, lithium bis(trifluoromethylsulfonyl)imide, lithium bis(fluorosulfonyl)imide, lithium difluorobis(oxalato)phosphate, lithium difluoro(oxalato)borate and lithium bis(oxalato)borate; and/or the carbonate ester compound is one or more of ethylene carbonate, fluoroethylene carbonate and vinylethylene carbonate.

Further, a mass of the first compound is 0.1-10% of a mass of the electrolytic solution.

Further, a mass of the first compound is 0.2-2% of a mass of the electrolytic solution.

Further, a mass of the second compound is 0.1-20% of a mass of the electrolytic solution.

Further, a mass of the second compound is 1-6% of a mass of the electrolytic solution.

A second aspect of the present disclosure provides a preparation method of any electrolytic solution described above, which is obtained by mixing an additive, an electrolyte and an organic solvent.

A third aspect of the present disclosure provides a lithium secondary battery, including any electrolytic solution described above.

The implementation of the present disclosure has at least the following advantages:

1. According to the electrolytic solution provided by the present disclosure, since the electrolytic solution contains the first compound, and an N-containing group in the first compound may be combined with a protonic acid in the electrolytic solution, the influence of the protonic acid on the electrolytic solution is avoided, making the electrolytic solution have good stability; moreover, the influence of the protonic acid on an electrode material can be avoided, excellent electrodes/electrolytic solution interface films are formed on positive and negative electrodes, the intercalation/deintercalation of lithium ions on the surfaces of the electrodes is optimized, and the cycle performance of the lithium secondary battery is improved.
2. The first compound used in the electrolytic solution provided by the present disclosure has a simple structure, is commercially available, and has simple and convenient preparation process.

DESCRIPTION OF EMBODIMENTS

In order to make the purpose, technical solutions and advantages of the present disclosure more clear, the technical solutions in the embodiments of the present disclosure will be clearly and completely described below in combination with the embodiments of the present disclosure. Obviously, the described embodiments are part of embodiments of the present disclosure, not all embodiments of the present disclosure. Based on the embodiments of the present disclosure, all other embodiments obtained by those skilled in the art without creative work belong to the protection scope of the present disclosure.

A first aspect of the present disclosure provides an electrolytic solution, including an organic solvent, an electrolyte, and an additive. The additive includes a first compound represented by Formula 1, where $R_1$ is selected from one of a single bond, substituted or unsubstituted alkoxy, C1-C6 alkylene, and C2-C6 alkenyl; $R_2$ and $R_3$ each are independently selected from one of substituted or unsubstituted alkoxy, C1-C6 alkylene, and C2-C6 alkenyl; and $R_4$ is B or P,

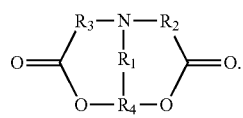

Formula 1

The present disclosure provides an electrolytic solution by adding an additive on the basis of the existing electrolytic solution. Specifically, the additive includes a first compound represented by Formula 1, where $R_1$ is selected from one of a single bond, substituted or unsubstituted alkoxy, C1-C6 alkylene, and C2-C6 alkenyl; $R_2$ and $R_3$ each are independently selected from one of substituted or unsubstituted alkoxy, C1-C6 alkylene, and C2-C6 alkenyl; and $R_4$ is B or P, where when $R_1$ in Formula 1 is a single bond, N and $R_4$ are directly connected. Among the substituted alkoxy, C1-C6 alkylene and C2-C6 alkenyl, a substituent group can be phenyl, fluorine, nitrile group and phosphate ester group.

The alkylene of the present disclosure refers to a linear or branched saturated hydrocarbon group with a general formula $C_nH_{2n}$, such as —$CH_2$—, —$CH_2CH_2$—, —CH($CH_3$)—$CH_2$—, etc; alkenyl refers to an olefin group containing a double bond, such as —CH=CH—, —CH=CH—$CH_2$—, —CH=CH—CH=CH—, etc; alkoxy is a group containing an oxygen atom with a structure of —OR—, such as —O—$CH_2$—, —O—$CH_2$—$CH_2$—, etc.

During preparation, those skilled in the art can prepare the electrolytic solution according to the existing technology, such as mixing an existing electrolyte and an organic solvent with the additive provided by the present disclosure. According to the electrolytic solution provided by the present disclosure, since the electrolytic solution contains the first compound, and an N-containing group in the first compound may be combined with a protonic acid in the electrolytic solution, the influence of the protonic acid on the electrolytic solution is avoided, making the electrolytic solution have good stability; moreover, the influence of the protonic acid on an electrode material can be avoided, excellent electrodes/electrolytic solution interface films are formed on positive and negative electrodes, the intercalation/deintercalation of lithium ions on the surfaces of the electrodes is optimized, and the cycle performance of the lithium secondary battery is improved. In addition, the first compound used in the electrolytic solution provided by the present disclosure has a simple structure, is commercially available, and has simple and convenient preparation process.

In one embodiment, the first compound is at least one of compounds shown in Formula 1-1, Formula 1-2, Formula 1-3 and Formula 1-4,

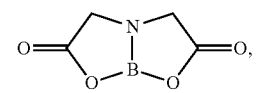

Formula 1-1

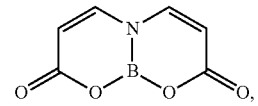

Formula 1-2

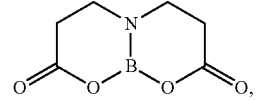

Formula 1-3 and

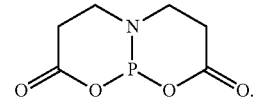

Formula 1-4

Specifically, in the compound shown in Formula 1-1, $R_1$ is a single bond, $R_2$ and $R_3$ each are methylene, and $R_4$ is B; in the compound shown in Formula 1-2, $R_1$ is a single bond, $R_2$ and $R_3$ each are vinylidene, and $R_4$ is B; in the compound shown in Formula 1-3, $R_1$ is a single bond, $R_2$ and $R_3$ each are ethylidene, and $R_4$ is B; in the compounds shown in Formula 1-4, $R_1$ is a single bond, $R_2$ and $R_3$ each are ethylidene, and $R_4$ is P.

Further, the inventor found that, on the basis of the above first compound, when the additive further includes a second compound, that is, the additive includes the first compound represented by Formula 1 and the second compound, the stability of the electrode/electrolyte solution interfacial film can be further improved, thereby further improving the cycle performance of the lithium secondary battery. Specifically, the second compound is one or more of a nitrile compound, a sulfur-containing compound, a phosphate ester compound, a borate ester compound, a lithium salt compound and a carbonate ester compound.

When the second compound of the present disclosure is selected from two or more of the above various types of compounds, the present disclosure does not limit a ratio between the compounds.

Further, the nitrile compound is one or more of succinonitrile, glutaronitrile, adiponitrile, pimelonitrile, octanedinitrile, sebaconitrile, octadecane dinitrile, glycerol trinitrile, ethylene glycol bis(propionitrile) ether, fumaric acid dinitrile, ethoxypentafluorophosphonitrile, and 1,3,6-hexanetrinitrile; and/or the sulfur-containing compound is one or more of 1,3-propanesultone, 1,3-propylenesultone, and ethylene sulfate; and/or the phosphate ester compound is one or more of tris(trimethylsilyl)phosphate, triallyl phosphate, trimethyl phosphate, triethyl phosphate and tripropyl phosphate; and/or the borate ester compound is one or more of tris(trimethylsilyl) borate and trimethyl borate; and/or the lithium salt compound is one or more of lithium difluorophosphate, lithium bis(trifluoromethylsulfonyl)imide, lithium bis(fluorosulfonyl)imide, lithium difluorobis(oxalato)phosphate, lithium difluoro(oxalato)borate and lithium bis(oxalato)borate; and/or the carbonate ester compound is one or more of ethylene carbonate, fluoroethylene carbonate and vinylethylene carbonate.

When the second compound of the present disclosure is selected from two or more of the above compounds, the present disclosure does not limit the ratio between the compounds.

In a specific implementation process of the present disclosure, by reasonably controlling the addition amount of the first compound in the electrolytic solution, it is conducive to further improve the cycle performance of the lithium secondary battery. Specifically, the mass of the first compound is 0.1-10% of the mass of the electrolyte solution.

The inventor made further research and found that with the increase of the amount of the first compound within a certain range, the cycle performance of the lithium secondary battery first increased, then remained basically unchanged, and finally decreased slightly. Therefore, for the consideration of economy and maximizing performance optimization, the mass content of the first compound in the electrolytic solution was controlled at 0.2-2%.

In addition, when the mass of the second compound is 0.1-20% of the mass of the electrolytic solution, the synergistic effect between the second compound and the first compound is more significant.

Further, the mass of the second compound is controlled to be 1-6% of the mass of the electrolytic solution also for the consideration of economy and maximizing performance optimization.

On the basis of the above additive provided by the present disclosure, the organic solvent and electrolyte in the electrolytic solution can be selected according to the existing technology.

Among them, the organic solvent may include one or more of organic solvents commonly used in the electrolytic solution of lithium secondary battery, such as cyclic organic solvent and linear organic solvent. Where the cyclic organic solvent is selected from one or more of ethylene carbonate, propylene carbonate, fluoroethylene carbonate, γ-butyrolactone and γ-valerolactone, etc; the linear organic solvent is selected from one or more of dimethyl carbonate, ethyl methyl carbonate, diethyl carbonate, methyl propyl carbonate, ethyl propionate, propyl propionate, 1,1,2,3-tetrafluoroethyl-2,2,3,3-tetrafluoropropyl ether, etc.

When the organic solvent in the electrolytic solution includes two or more of the above compounds, the present disclosure does not particularly limit a ratio between the compounds.

A mass ratio of the organic solvent to the electrolytic solution can also be selected according to the conventional technology in this field, which is not limited by the present disclosure. For example, the mass of the organic solvent is 60-88% of the mass of the electrolytic solution.

The electrolyte may include lithium salts commonly used in the existing electrolytic solutions of lithium secondary battery, such as one or more of lithium difluorophosphate ($LiPF_2O_2$), lithium difluorobis(oxalato)phosphate (LiDFOP), lithium hexafluorophosphate ($LiPF_6$), lithium bis(fluorosulfonyl)imide (LiFSI), lithium difluoro(oxalato)borate (LiDFOB), lithium bis(trifluoromethylsulfonyl)imide (LiTFSI) and lithium bis(oxalato)borate (LiBOB).

When the lithium salt in the electrolytic solution includes two or more of the above compounds, the present disclosure does not particularly limit a ratio between the compounds.

The mass ratio of the lithium salt in the electrolytic solution is also selected according to the conventional technology in this field, which is not limited by the present disclosure. For example, the mass of the lithium salt is 8-25% of the mass of the electrolytic solution.

To sum up, according to the electrolytic solution provided by the present disclosure, since the electrolytic solution contains the first compound, and an N-containing group in the first compound may be combined with a protonic acid in the electrolytic solution, the influence of the protonic acid on the electrolytic solution is avoided, making the electrolytic solution have good stability; moreover, the influence of the protonic acid on an electrode material can be avoided, excellent electrodes/electrolytic solution interface films are formed on positive and negative electrodes, the intercalation/deintercalation of lithium ions on the surfaces of the electrodes is optimized, and the cycle performance of the lithium secondary battery is improved.

A second aspect of the present disclosure provides a preparation method of any electrolytic solution described above, which is obtained by mixing an additive, an electrolyte and an organic solvent.

The second aspect of the present disclosure provides a preparation method of an electrolytic solution, which can be prepared by using a conventional electrolytic solution, that is, the electrolytic solution can be obtained by mixing the additive provided by the present disclosure, a conventional electrolyte and an organic solvent. Where the selection and mass ratio of the additive are as described above, the electrolyte and organic solvent can be selected and prepared according to the existing technologies. The electrolyte solution obtained according to the preparation method provided by the present disclosure, due to that the electrolytic solution contains the first compound and an N-containing group in the first compound may be combined with a protonic acid in the electrolytic solution, not only avoids the influence of the protonic acid on the electrolytic solution, making the electrolytic solution have good stability; but also avoids the influence of the protonic acid on the electrode material, forms excellent electrodes/electrolytic solution interface films on positive and negative electrodes, optimizes the intercalation/deintercalation of lithium ions on the surfaces of the electrodes, and improves the cycle performance of the lithium secondary battery.

A third aspect of the present disclosure provides a lithium secondary battery, including any electrolytic solution described above.

The third aspect of the present disclosure provides a lithium secondary battery. On the basis of the electrolytic solution provided by the present disclosure, those skilled in the art can prepare a lithium secondary battery by conventional technical means. For example, the positive electrode, the diaphragm and the negative electrode are stacked in order where the diaphragm is between the positive and negative electrodes to play the role of isolation, and then the bare cell is obtained by coiling, and the bare cell is placed in an outer packaging shell. After drying, the electrolytic solution provided by the present disclosure is injected, and the lithium secondary battery is prepared through the processes such as vacuum packaging, standing, forming, shaping, etc.

The positive electrode includes a positive collector layer and a positive electrode film arranged on a surface of the positive collector layer, and the positive electrode film is formed by a positive active material. Specifically, at least one positive active material, a conductive agent and a binder can be dispersed in an appropriate amount of N-methylpyrrolidone (NMP) solvent, fully stirred and mixed to form a uniform positive electrode slurry, and the positive electrode slurry is evenly coated on the positive collector layer, dried, rolled and slit to obtain the positive electrode film.

The positive active material can be selected from one or more of the existing metal composite oxides of lithium with cobalt, manganese, or nickel and with their combinations. For example, the composite oxides include lithium cobaltate, lithium nickelate, lithium manganate, nickel cobalt manganese ternary material, nickel cobalt aluminum ternary material, lithium ferrous phosphate (LFP), lithium nickel manganate, lithium-rich manganese based material, etc.

The material of the positive collector layer can be one or more of aluminum foil and nickel foil.

The conductive agent can be selected from one or more of carbon black, acetylene black, graphene, Ketjen black and carbon fiber.

The binder can be selected from one or more of polytetrafluoroethylene, polyvinylidene difluoride, polyvinyl fluoride, polyethylene, polypropylene, polyvinyl alcohol, carboxymethyl cellulose, hydroxypropyl cellulose, diacetyl cellulose, polyvinyl chloride, carboxylated polyvinyl chloride, polymer containing ethylene oxide, polyvinyl pyrrolidone and polyurethane.

The negative electrode includes a negative collector layer and a negative electrode film arranged on a surface of the negative collector layer, and the negative electrode film is formed by a negative active material. Specifically, the negative electrode active material, a conductive agent and a binder can be dispersed in an appropriate amount of deionized water, fully stirred and mixed to form a uniform negative electrode slurry; the negative electrode slurry is evenly coated on the negative collector layer, dried, rolled and slit, to obtain the negative electrode film.

The negative active material can be selected from one or more of the existing carbon-containing materials, such as artificial graphite, hard carbon, soft carbon, etc.

The material of the negative collector layer can be one or more of copper foil, foam nickel and foam copper.

The conductive agent can be selected from one or more of natural graphite, artificial graphite, carbon black, acetylene black, Ketjen black, carbon fiber and graphene.

The binder can be selected from one or more of carboxymethyl cellulose, styrene butadiene rubber, polyvinyl chloride, carboxylated polyvinyl chloride, polyvinyl fluoride, polymer containing ethylene oxide, polyvinyl pyrrolidone, polyurethane, polytetrafluoroethylene, polyvinylidene fluoride, polyethylene, polypropylene, polyamide imide, polyvinyl alcohol, sodium polyacrylate, etc.

The diaphragm can be selected from one of the existing diaphragm materials, such as polypropylene (PP) diaphragm, polyethylene (PE) diaphragm, polyvinylidene difluoride diaphragm, etc.

The present disclosure does not strictly limit the material selection of the positive electrode, negative electrode and diaphragm, and they can be the commonly used materials in the existing lithium secondary batteries, and are not limited to the above materials.

In conclusion, according to the lithium secondary battery provided by the present disclosure, since the electrolytic solution contains the first compound, and an N-containing group in the first compound may be combined with a protonic acid in the electrolytic solution, the influence of the protonic acid on the electrolytic solution is avoided, making the electrolytic solution have good stability; moreover, the influence of the protonic acid on an electrode material can be avoided, excellent electrodes/electrolytic solution interface films are formed on positive and negative electrodes, and the intercalation/deintercalation of lithium ions on the surfaces of the electrodes is optimized. Therefore, the lithium secondary battery has good cycle performance.

Hereinafter, the electrolyte solution and lithium secondary battery of the present disclosure are introduced in detail through specific examples. The first compound used in each example of the present disclosure is purchased from Aladdin, and the second compound in each example of the present disclosure is purchased from Thiai (Shanghai) Chemical Industry Development Co., Ltd.

EXAMPLE 1

The electrolytic solution provided in this example includes 84% of an organic solvent, 12% of $LiPF_6$, 1% of first compound shown in Formula 1-1 and 3% of glycerol trinitrile, and the above components were mixed to obtain the electrolytic solution, where the organic solvent was obtained by mixing ethylene carbonate, ethyl methyl carbonate and diethyl carbonate in a volume ratio of 3:5:2.

On the basis of the electrolytic solution provided in this example, a positive electrode, a diaphragm and a negative electrode were stacked in sequence by a conventional process, and then coiled to obtain a bare cell, and the bare cell was placed in an outer packaging shell, dried, and then the electrolyte provided in this example was injected therein, and then a lithium secondary battery C1 was prepared through vacuum packaging, standing, forming, shaping and other processes.

Where the preparation method of the positive electrode was as follows:

Lithium cobaltate, acetylene black as conductive agent and PVDF as binder were dispersed in an appropriate amount of N-methylpyrrolidone (NMP) solvent, fully stirred and mixed to form a uniform positive electrode slurry; the positive electrode slurry was evenly coated on the positive collector layer, and the positive electrode was obtained after drying, rolling and slitting.

The preparation method of the negative electrode was as follows:

Graphite, acetylene black as conductive agent, SBR and CMC as binders were dispersed in an appropriate amount of deionized water, fully stirred and mixed to form a uniform negative electrode slurry; the negative electrode slurry was evenly coated on the negative collector layer, and the negative electrode was obtained by drying, rolling and slitting.

The diaphragm adopted polypropylene (PP) diaphragm.

EXAMPLE 2

The electrolytic solution provided in this example includes 86.5% of an organic solvent, 12% of $LiPF_6$ and 1.5% of the first compound shown in Formula 1-1, and the above components were mixed to obtain the electrolytic solution, where the organic solvent was obtained by mixing ethylene carbonate, ethyl methyl carbonate and diethyl carbonate in a volume ratio of 3:5:2.

A lithium secondary battery C2 was prepared by the electrolytic solution provided in this example in combination with the preparation method of the lithium secondary battery provided in Example 1.

EXAMPLE 3

The electrolyte solution provided in this example includes 87.9% of an organic solvent, 12% of $LiPF_6$ and 0.1% of the first compound shown in Formula 1-1, and the above components were mixed to obtain the electrolytic solution, where the organic solvent was obtained by mixing ethylene carbonate, ethyl methyl carbonate and diethyl carbonate in a volume ratio of 3:5:2.

A lithium secondary battery C3 was prepared by the electrolytic solution provided in this example in combination with the preparation method of the lithium secondary battery provided in Example 1.

EXAMPLE 4

The electrolyte provided in this example includes 80% of an organic solvent, 12% of $LiPF_6$ and 8% of the first compound shown in Formula 1-1, and the above components were mixed to obtain the electrolytic solution, where the organic solvent was obtained by mixing ethylene carbonate, ethyl methyl carbonate and diethyl carbonate in a volume ratio of 3:5:2.

A lithium secondary battery C4 was prepared by the electrolytic solution provided in this example in combination with the preparation method of the lithium secondary battery provided in Example 1.

EXAMPLE 5

The electrolytic solution provided in this example includes 84% of an organic solvent, 12% of $LiPF_6$, 1% of first compound shown in Formula 1-2 and 3% of glycerol trinitrile, and the above components were mixed to obtain the electrolytic solution, where the organic solvent was obtained by mixing ethylene carbonate, ethyl methyl carbonate and diethyl carbonate in a volume ratio of 3:5:2.

A lithium secondary battery C5 was prepared by the electrolytic solution provided in this example in combination with the preparation method of the lithium secondary battery provided in Example 1.

EXAMPLE 6

The electrolytic solution provided in this example includes 84% of an organic solvent, 12% of $LiPF_6$, 3% of first compound shown in Formula 1-3 and 1% of lithium difluorobis(oxalato)phosphate, and the above components were mixed to obtain the electrolytic solution, where the organic solvent was obtained by mixing ethylene carbonate, ethyl methyl carbonate and diethyl carbonate in a volume ratio of 3:5:2.

A lithium secondary battery C6 was prepared by the electrolytic solution provided in this example in combination with the preparation method of the lithium secondary battery provided in Example 1.

EXAMPLE 7

The electrolytic solution provided in this example includes 84% of an organic solvent, 12% of $LiPF_6$, 0.5% of the first compound shown in Formula 1-3, 0.5% of the first compound shown in Formula 1-4 and 3% of tris(trimethylsilyl)phosphate, and the above components were mixed to obtain the electrolytic solution, where the organic solvent was obtained by mixing ethylene carbonate, ethyl methyl carbonate and diethyl carbonate in a volume ratio of 3:5:2.

The electrolytic solution provided in this example was combined with the preparation method of lithium secondary battery provided in Example 1 to obtain a lithium secondary battery C7.

Comparative Example 1

The electrolytic solution provided in this comparative example includes 88% of an organic solvent and 12% of $LiPF_6$, which were mixed to obtain the electrolytic solution, where the organic solvent was obtained by mixing ethylene carbonate, ethyl methyl carbonate and diethyl carbonate in a volume ratio of 3:5:2.

A lithium secondary battery D1 was prepared by the electrolytic solution provided in this comparative example in combination with the same preparation method of lithium secondary battery in Example 1.

Comparative Example 2

The electrolytic solution provided in this comparative example includes 85% of an organic solvent, 12% of $LiPF_6$ and 3% of glycerol trinitrile, and the above components were mixed to obtain the electrolytic solution, where the organic solvent was obtained by mixing ethylene carbonate, ethyl methyl carbonate and diethyl carbonate in a volume ratio of 3:5:2.

A lithium secondary battery D2 was prepared by the electrolytic solution provided in this comparative example in combination with the same preparation method of lithium secondary battery in Example 1.

Comparative Example 3

The electrolytic solution provided in this comparative example includes 77% of an organic solvent, 12% of $LiPF_6$, 8% of ethylene carbonate and 3% of glycerol trinitrile, and the above components were mixed to obtain the electrolyte solution, where the organic solvent was obtained by mixing ethylene carbonate, ethyl methyl carbonate and diethyl carbonate in a volume ratio of 3:5:2.

A lithium secondary battery D3 was prepared by the electrolytic solution provided in this comparative example in combination with the same preparation method of lithium secondary battery in Example 1.

The present disclosure tests the performance of the electrolytic solutions and the lithium secondary batteries provided by Examples 1-7 and Comparative Examples 1-3. The specific description is as follows:

1. Storage Test of Electrolytic Solution

The electrolytic solution is placed in an aluminum bottle, which is vacuum sealed with an aluminum plastic film, and then stored in a 55° incubator for 6 days, and then, a sample is taken to test its acidity. The test results are shown in Table 1.

2. High Temperature Cycle Test of Lithium Secondary Battery

The lithium secondary battery is set aside at 45° C. and is subjected to charge and discharge cycles at a charge-discharge voltage range of 2.8-4.4V using 1 C current. The initial capacity is recorded as Q and the capacity after 400 cycles as Q2. The capacity retention rate of high-temperature cycle is calculated according to the following formula. The test results are shown in Table 1.

Capacity retention rate (%)=$Q2/Q \times 100$

TABLE 1

Test results of the performance of the electrolytic solutions and the lithium secondary batteries provided by Examples 1-7 and Comparative Examples 1-3

| Sample | Acidity | Capacity retention rate |
| --- | --- | --- |
| Example 1 | 21.67 | 96.5% |
| Example 2 | 23.57 | 94.7% |
| Example 3 | 24.52 | 93.1% |
| Example 4 | 24.14 | 93.5% |
| Example 5 | 27.34 | 95.27 |
| Example 6 | 28.42 | 91.23 |
| Example 7 | 20.48 | 90.06 |
| Comparative Example 1 | 89.47 | 65.7% |
| Comparative Example 2 | 70.93 | 69.2% |
| Comparative Example 3 | 59.07 | 69.4% |

It can be seen from Table 1 that the acidity of the electrolytic solutions provided in Examples 1-7 is significantly lower than that of Comparative Examples 1-3, and the capacity retention rate of lithium secondary batteries C1-C7 prepared with the electrolytic solutions has also been significantly improved. Therefore, the electrolytic solution provided by the present disclosure has good stability, and the use of the electrolytic solution can significantly improve the cycle performance of lithium secondary batteries.

Finally, it should be noted that the above examples are only used to illustrate the technical solution of the present disclosure, not to limit it; although the present disclosure has been described in detail with reference to the above examples, those skilled in the art should understand that they may still modify the technical solutions recorded in the above examples or equivalently replace some or all of the technical features therein; these modifications or replacements do not make the essence of the corresponding technical solutions depart from the scope of the technical solutions of the examples of the present disclosure.

What is claimed is:

1. An electrolytic solution, comprising an organic solvent and an electrolyte, wherein the electrolytic solution further comprises an additive, the additive comprises a first compound represented by Formula 1, wherein $R_1$ is selected from one of a single bond, substituted or unsubstituted alkoxy, C1-C6 alkylene, and C2-C6 alkenyl; $R_2$ and $R_3$ each are independently selected from one of substituted or unsubstituted alkoxy, C1-C6 alkylene, and C2-C6 alkenyl; and $R_4$ is B or P,

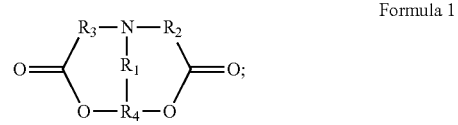

Formula 1 wherein the first compound is at least one of compounds represented by Formula 1-1, Formula 1-2, Formula 1-3 and Formula 1-4,

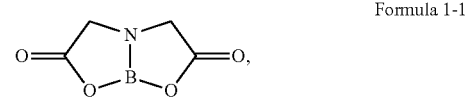

Formula 1-1

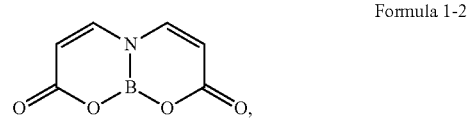

Formula 1-2

Formula 1-3 and

Formula 1-4

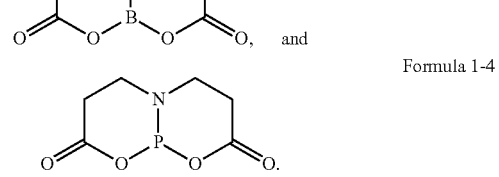

2. The electrolytic solution according to claim 1, wherein the additive further comprises a second compound, which is one or more of nitrile compound, sulfur-containing compound, phosphate ester compound, borate ester compound, lithium salt compound and carbonate ester compound.

3. The electrolytic solution according to claim 2, wherein the nitrile compound is one or more of succinonitrile, glutaronitrile, adiponitrile, pimelonitrile, octanedinitrile, sebaconitrile, octadecane dinitrile, glycerol trinitrile, ethylene glycol bis(propionitrile) ether, fumaric acid dinitrile, ethoxypentafluorophosphonitrile, 1,3,6-hexanetrinitrile; the sulfur-containing compound is one or more of 1,3-propanesultone, 1,3-propylenesultone, and ethylene sulfate; the phosphate ester compound is one or more of tris(trimethylsilyl) phosphate, triallyl phosphate, trimethyl phosphate, triethyl phosphate and tripropyl phosphate; the borate ester compound is one or more of tris(trimethylsilyl) borate ester and trimethyl borate ester; the lithium salt compound is one or more of lithium difluorophosphate, lithium bis(trifluoromethylsulfonyl)imide, lithium bis(fluorosulfonyl)imide, lithium difluorobis(oxalato)phosphate, lithium difluoro (oxalato) borate and lithium bis(oxalato) borate; and the carbonate compound is one or more of ethylene carbonate, fluoroethylene carbonate and vinylethylene carbonate.

4. The electrolytic solution according to claim 1, wherein a mass of the first compound is 0.1-10% of a mass of the electrolytic solution.

5. The electrolytic solution according to claim 1, wherein a mass of the first compound is 0.2-2% of a mass of the electrolytic solution.

6. The electrolytic solution according to claim 2, wherein a mass of the second compound is 0.1-20% of a mass of the electrolytic solution.

7. The electrolytic solution according to claim 2, wherein a mass of the second compound is 1-6% of a mass of the electrolytic solution.

8. A method for preparing an electrolytic solution according to claim 1, wherein the electrolytic solution is obtained by mixing an additive, an electrolyte and an organic solvent, wherein the additive comprises a first compound represented by Formula 1, wherein $R_1$ is selected from one of a single bond, substituted or unsubstituted alkoxy, C1-C6 alkylene, and C2-C6 alkenyl; $R_2$ and $R_3$ each are independently selected from one of substituted or unsubstituted alkoxy, C1-C6 alkylene, and C2-C6 alkenyl; and $R_4$ is B or P,

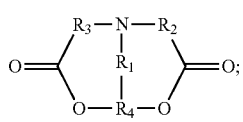

Formula 1 wherein the first compound is at least one of compounds represented by Formula 1-1, Formula 1-2, Formula 1-3 and Formula 1-4.

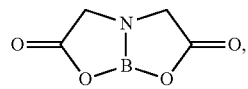

Formula 1-1

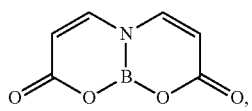

Formula 1-2

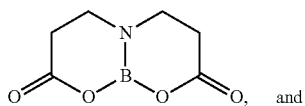

Formula 1-3 and

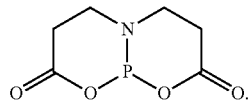

Formula 1-4

9. The method according to claim 8, wherein the additive further comprises a second compound, which is one or more of nitrile compound, sulfur-containing compound, phosphate ester compound, borate ester compound, lithium salt compound and carbonate ester compound.

10. The method according to claim 9, wherein the nitrile compound is one or more of succinonitrile, glutaronitrile, adiponitrile, pimelonitrile, octanedinitrile, sebaconitrile, octadecane dinitrile, glycerol trinitrile, ethylene glycol bis(propionitrile) ether, fumaric acid dinitrile, ethoxypentafluorophosphonitrile, 1,3,6-hexanetrinitrile; the sulfur-containing compound is one or more of 1,3-propanesultone, 1,3-propylenesultone, and ethylene sulfate; the phosphate ester compound is one or more of tris(trimethylsilyl) phosphate, triallyl phosphate, trimethyl phosphate, triethyl phosphate and tripropyl phosphate; the borate ester compound is one or more of tris(trimethylsilyl) borate ester and trimethyl borate ester; the lithium salt compound is one or more of lithium difluorophosphate, lithium bis(trifluoromethylsulfonyl)imide, lithium bis(fluorosulfonyl)imide, lithium difluorobis(oxalato)phosphate, lithium difluoro (oxalato) borate and lithium bis(oxalato) borate; and the carbonate compound is one or more of ethylene carbonate, fluoroethylene carbonate and vinylethylene carbonate.

11. The method according to claim 8, wherein a mass of the first compound is 0.1-10% of a mass of the electrolytic solution.

12. The method according to claim 8, wherein a mass of the first compound is 0.2-2% of a mass of the electrolytic solution.

13. The method according to claim 9, wherein a mass of the second compound is 0.1-20% of a mass of the electrolytic solution.

14. The method according to claim 9, wherein a mass of the second compound is 1-6% of a mass of the electrolytic solution.

15. A lithium secondary battery, comprising the electrolytic solution according to claim 1.

* * * * *